Patented Dec. 4, 1945

2,390,225

UNITED STATES PATENT OFFICE 2,390,225

MANUFACTURE OF CEMENT

Laurence R. Sherman, Glens Falls, N. Y., and Charles R. Bartels, South Orange, N. J., assignors to National Oil Products Company, Harrison, N. J., a corporation of New Jersey No Drawing. Application July 12, 1941, Serial No. 402,228

5 Claims. (Cl. 106—100)

This invention relates in general to the manufacture of cement, more particularly to a process for increasing the fluidity of mineral slurries used in the manufacture of cement.

In the manufacture of cement, the silicate-containing materials must be thoroughly ground and mixed together before being burned in the kilns. In many cases the mixing and grinding are carried out by what is known as the "wet process." As the name implies, the process is one in which the raw materials are in a relatively fluid condition because of the presence in the mix of a relatively large percentage of water. In some cases the raw materials in their natural state may contain large amounts of water, but oftentimes it is necessary to add even more water to obtain the desired fluidity of the mixture; this relatively fluid mineral mixture is known as "slurry."

Since all of the water present in the slurry has to be evaporated off in the kiln, which of course requires a large amount of heat, it is desirable to have as low a percentage of water in the slurry as possible. However, as the water content is reduced the power consumption for pumping the slurry goes up and cancels the heat economy. Furthermore, if the percentage of water is reduced very much, the viscosity of the slurry is so increased that the slurry will not flow or cannot be handled by the pumps at all.

In order to overcome such disadvantages, many attempts have been made to find some means of decreasing the water content of the slurry without reducing its fluidity. Various so-called "dispersing agents" have been added to the slurry in an attempt to obtain a suitable fluidity at a reduced moisture content. However, as yet, for one reason or another, none of the materials which have been used heretofore have been entirely satisfactory for such purposes.

It is the object of this invention to provide a process for decreasing the water content of mineral slurries used in the manufacture of cement without materially reducing the fluidity of the slurries.

It is also the object of this invention to provide a process for increasing the fluidity of mineral slurries used in the manufacture of cement without materially increasing the water content thereof.

Other objects of the invention will in part be obvious and will in part appear hereinafter.

It has now been found that the foregoing and other objects of the invention may be accomplished by incorporating into mineral slurries used in the manufacture of cement a material such as a metallic salt of a lignin sulfonic acid, a highly sulfated fatty acid, a sulfonated cresol compound or one of its derivatives, a tanning extract, such as quebracho, or any highly calcium resistant material which has a dispersing action on the particles of the mineral slurry. The term "viscosity reducing agent" will be used in the specification and claims to connote such materials. The term "highly calcium resistant material" is used in the specification and claims to connote a material which is not precipitated from solution by calcium ions.

Such materials when added to mineral slurries have a very desirable effect in reducing the viscosity thereof. Consequently, to obtain a certain desired viscosity in a slurry, it is not necessary to have as high a water content as when such materials have not been added; therefore, the expense of evaporating the water from the slurry in the kiln is reduced, and the power consumption for pumping, etc., is not increased.

Only very small amounts of the materials which are used need to be added to give the desired results. In most cases quantities from 0.01% to 0.5% based on the total weight of the slurry will usually allow considerable reductions in moisture content of the slurry without a corresponding increase in viscosity. However, the amount of the agent added may be varied within wider limits than those stated if it is desired to do so.

The viscosity reducing agent should be added when the slurry is made up. It may be added in any convenient or desirable manner, such as by dripping an aqueous solution of it into the feed of the crushing or mixing mill where the fresh rock is dispersed in water to form the slurry.

In the burning of the mineral mixture to form the clinker, the very high temperatures of the kilns will, of course, destroy the viscosity reducing agents, and they will therefore have no further action in the manufacturing process.

In carrying out the process of the invention, it is preferred to add an addition agent, which contains an $SO_3$ group. As examples of such there may be mentioned metallic salts of lignin sulfonic acids, highly sulfated fatty acids, and sulfonated cresol compounds and derivatives thereof. Because of their availability and relatively inexpensiveness at the present time and their efficient action, the metallic salts of the lignin sulfonic acids are probably the most suitable to use. However, the highly sulfated fatty acids and the sulfonated cresol compounds are also quite applicable and will give excellent results. Of the highly sulfated fatty acids, sulfated oleic acid having an $SO_3$ content of over 10% is preferred.

One of the most convenient sources of the metallic salts of the lignin sulfonic acids is waste sulfite liquor derived from the manufacture of paper pulp. This waste sulfite liquor usually contains large amounts of calcium lignin sulfonates or other metallic salts of lignin sulfonic acids, which are very effective viscosity reducing agents. One of the most convenient ways to add the metallic salts of the lignin sulfonic acids to the mineral slurries, therefore, is merely to add either the waste sulfite liquor as such or in a partially concentrated form, or the dried residue thereof. However, if desired, the waste sulfite liquors may be treated by any suitable means which will separate the non-ligneous organic material from the ligneous material, and the metallic salts of the lignin sulfonic acids may then be obtained and added to the mineral slurries without adding non-ligneous organic material.

For a fuller understanding of the nature and objects of the invention, reference should be had to the following examples which are given merely to further illustrate the invention and are not to be construed in a limiting sense, all parts given being by weight.

*Example I*

To show the effect of the viscosity reducing agents on mineral slurries, seven 1200 gram samples of slurry, each containing 400 gms. (33.3%) of water were prepared. To six of the samples, varying amounts of waste sulfite liquor were added, the seventh sample being used as a standard, and the viscosities of the samples then determined by means of a standardized pipette, measuring the time of flow for a definite quantity of slurry by means of a stop watch. The results were as follows:

| Sample | Viscosity reducing agent added (based on total weight of the slurry) | Viscosity |
| --- | --- | --- |
| | Percent | Seconds |
| Standard | None | 352 |
| 1 | 0.017 | 253 |
| 2 | 0.033 | 237 |
| 3 | 0.067 | 84 |
| 4 | 0.100 | 10 |
| 5 | 0.133 | 7 |
| 6 | 0.167 | 5 |

*Example II*

Seven samples of slurry containing from none to 0.5% of waste sulfite liquor (based on the water content of the slurry) were prepared. The standard was prepared by using 800 gms. of dry slurry and running-in plain water until a viscosity of 352 secs. by the pipette method (explained in Example I) was obtained. For sample #1 water containing 0.05% of waste sulfite liquor was run into 800 gms. of dry slurry until a viscosity of 352 secs. was obtained. The other five samples were similarly prepared except that in each succeeding case, the water which was used contained increasingly larger amounts of viscosity reducing agent as indicated in the following table, which shows the reduction in water content of slurries that may be obtained without reducing their viscosity by using the viscosity reducing agents of our invention.

| Sample | Viscosity reducing agent added (based on the water content of the slurry) | Water necessary to give a viscosity equal to that of a slurry containing 33% water and no viscosity reducing agent |
| --- | --- | --- |
| | Percent | Percent |
| Standard | None | 33 |
| 1 | 0.05 | 32.8 |
| 2 | 0.1 | 32.0 |
| 3 | 0.2 | 30.6 |
| 4 | 0.3 | 29.8 |
| 5 | 0.4 | 29.0 |
| 6 | 0.5 | 28.6 |

*Example III*

Three 2000 lb. samples of wet slurry were prepared. Sample #1 did not contain any viscosity reducing agent, and in order to obtain a desirable viscosity it was necessary to use 33.5% of water in the mix. Samples #'s 2 and 3 were prepared using 30.6% and 28.6% of water, respectively. Sufficient amounts of partially concentrated waste sulfite liquor were then added to samples 2 and 3 to give them the same viscosity as sample #1. For sample #2 only 1.2 lbs. of viscosity reducing agent (0.06% of the total weight of the slurry) were required to give the sample the same viscosity as sample #1. For sample #3 which contained 28.6% water, only 2.87 lbs. of viscosity reducing agent (0.14% of the total weight of the slurry) were required to give the sample the same viscosity as sample #1.

Thus in sample #2 it was possible to increase the amount of dry slurry in the wet mix by 57 lbs. over the amount of dry slurry in sample #1 with, of course, a corresponding decrease in the amount of water used, both slurries having the same viscosity.

In sample #3 it was possible to increase the content of dry slurry approximately 94 lbs. over that of sample #1 and to decrease the amount of water a corresponding amount, and yet sample #3 still had the same viscosity as sample #1 because of the addition of a small amount of one of the viscosity reducing agents of our invention.

Somewhat similar experiments using highly sulfonated oleic acid, quebracho extract, sulfonated cresol compounds, and sodium lignin sulfonate as viscosity reducing agents gave results very similar to those obtained with waste sulfite liquors.

From the above examples and description, it can readily be seen that reductions of 10% to 15% (based on the total water content) of the water content of mineral slurries used in the manufacture of cement can easily be made without decreasing the viscosity of the slurries simply by the addition of the viscosity reducing agents set forth hereinabove. Thus very substantial savings can be effected in the heat consumption at the kilns.

Of course, the amount of water necessary to give the proper viscosity to a slurry varies with the types of materials used in making up the slurry. In most cases when no viscosity reducing agent is added, it will be necessary to use at least 33% to 35% water to give the proper viscosity, and in some cases it may be necessary to use from 38% to 40% water. However, in all cases, the amount of water which it is necessary to use may be reduced from 10% to 15% by the use of our viscosity reducing agents.

As in many cases at the present time, it is desired to obtain a finished cement having a low $Na_2O$ content and a low $K_2O$ content, we prefer to use the calcium salts of the lignin sulfonic acids as they will in no way interfere with these values. However, even if the sodium or potassium salts of these acids were used, they would have very little effect on the final $Na_2O$ and $K_2O$ content of the cement as only a very small amount of the viscosity reducing agents is required to obtain the desired results, as can readily be seen from the examples which have been given hereinabove.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which, as a matter of language, might be said to fall therebetween; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

Having described our invention, what we claim as new and desire to secure by Letters Patent is:

1. In a process for the production of Portland cement which normally includes preparing an aqueous slurry of unburned siliceous material proportioned for burning in a cement kiln to produce Portland cement, the slurry being of pumpable viscosity with the use of a minimum of water and normally including from approximately 33 to 40% of water, the steps which consist of adding to siliceous dry materials proportioned for burning in a cement kiln to form Portland cement a quantity of water from 10 to 15% lower in amount than that normally used together with a viscosity reducing agent selected from the class consisting of metallic salts of lignin sulfonic acid, highly sulfated fatty acids, sulfonated cresol compounds and derivatives thereof and thereafter burning said slurry to produce cement clinker.

2. In a process for the production of Portland cement which normally includes preparing an aqueous slurry of unburned siliceous material proportioned for burning in a cement kiln to produce Portland cement, said slurry being of pumpable viscosity with the use of a minimum of water and normally including from approximately 33 to 40% of water, the steps which consist of adding to siliceous dry materials proportioned for burning in a cement kiln to form Portland cement a quantity of water from 10 to 15% lower in amount than that normally used together with metallic salts of lignin sulfonic acids and thereafter burning said slurry to produce cement clinker.

3. In a process for the production of Portland cement which normally includes preparing an aqueous slurry of unburned siliceous material proportioned for burning in a cement kiln to produce Portland cement, said slurry being of pumpable viscosity with the use of a minimum of water and normally including from approximately 33 to 40% of water, the steps which consist of adding to siliceous dry materials proportioned for burning in a cement kiln to form Portland cement a quantity of water from 10 to 15% lower in amount than that normally used together with calcium salts of lignin sulfonic acids and thereafter burning said slurry to produce cement clinker.

4. In a process for the production of Portland cement which normally includes preparing an aqueous slurry of unburned siliceous material proportioned for burning in a cement kiln to produce Portland cement, said slurry being of pumpable viscosity with the use of a minimum of water and normally including from approximately 33 to 40% of water, the steps which consist of adding to siliceous dry materials proportioned for burning in a cement kiln to form Portland cement a quantity of water from 10 to 15% lower in amount than that normally used together with sodium salts of lignin sulfonic acid and thereafter burning said slurry to produce cement clinker.

5. In a process for the production of Portland cement which normally includes preparing an aqueous slurry of unburned siliceous material proportioned for burning in a cement kiln to produce Portland cement, said slurry being of pumpable viscosity with the use of a minimum of water and normally including from approximately 33 to 40% of water, the steps which consist of adding to siliceous dry materials proportioned for burning in a cement kiln to form Portland cement a quantity of water from 10 to 15% lower in amount than that normally used together with a small amount of a waste sulfite liquor and thereafter burning said slurry to produce cement clinker.

LAURENCE R. SHERMAN.
CHARLES R. BARTELS.